April 18, 1944. V. WALKER 2,347,011

TREATMENT OF GLASSWARE

Filed Sept. 4, 1942

INVENTOR
VICTOR WALKER
BY
Bean Brook Buckley Bean

Patented Apr. 18, 1944

2,347,011

UNITED STATES PATENT OFFICE 2,347,011

TREATMENT OF GLASSWARE

Victor Walker, Fort Erie, Ontario, Canada, assignor to AlnCin, Inc., Buffalo, N. Y.

Application September 4, 1942, Serial No. 457,321

4 Claims. (Cl. 41—42)

This invention relates to methods and means for manufacturing etched glassware such as relatively deeply etched ornamental glass fabrications and microscopically calibrated glass pieces such as reading scales used in connection with optical instruments, or the like.

One of the objects of the invention is to provide an improved method for deeply etching glass stock; as for example in connection with the manufacture of improved types of etched useful and ornamental glassware. Another object is to provide an improved etching method whereby glassware may be recessed to increased depth and an ornamenting pigment substance disposed therein in improved manner whereby an ornamented glassware of improved form is provided.

Another object of the invention is to provide an improved method for minutely etching a glass stock piece as through a microscopically narrow channel in an etch masking medium, such as wax or the like. Another object of the invention is to provide an improved method for the purpose last stated whereby the by-products of the etching action upon the glass stock piece are displaced from the situs of the etching action in an improved manner and with increased speed and uniformity of displacement throughout the length of the channel through the masking medium, whereby a uniform etching action takes place upon the entire unmasked area of the stock piece, and whereby an etching mark of greater depth and improved evenness of depth is provided.

Another object of the invention is to provide an improved glassware article by first producing thereon the improved etched mark referred to hereinabove and disposing therein a pigment substance in improved manner. Other objects and advantages of the invention will appear from the specification hereinafter.

Figure 1:
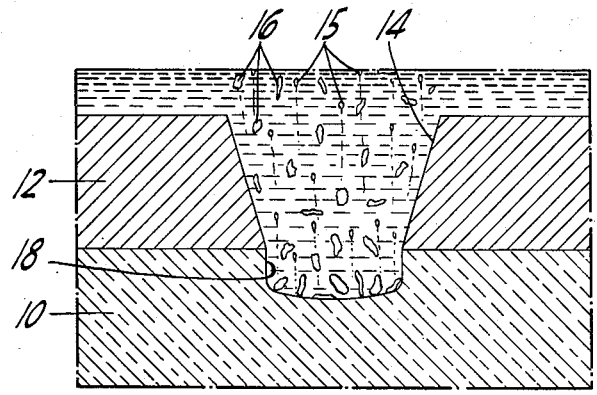
Fig. 1 is a transverse section, on a greatly enlarged scale, of a glass stock piece having a scored etch masking layer thereon and illustrated as being subjected to the etching method of the invention.

The glass stock piece is designated at 10 as having a coating of wax or the like layered thereon as indicated at 12. The layer 12 has been previously scored as indicated at 14, by means of a stylus point or the like to follow the pattern for the etching to be produced in the glass piece. Thus, it will be understood that the groove or stylus cut 14 through the layer 12 may be, as indicated in the drawing, of tapered wall form; or it may be of any other sectional configuration which will depend upon the shape of the point of the scoring stylus. In any case it will be understood that due to the relatively narrow form of the groove through the masking wax, the etching solution will be required to act against the glass stock piece at the bottom of a relatively deep well through the body of the mask.

It is of course well known that an aqueous solution of hydrofluoric acid will etch the standard kinds of glass, and that the etching action referred to consists of a chemical reaction between the constituents of the glass and the hydrofluoric acid whereby silica fluoride and metallic-fluoride salts are formed; such as sodium and calcium fluorides and the like, depending upon the chemical contents of the glass stock piece. Such metallic fluorides are substantially insoluble in the etching acid solution and tend to adhere to the surface of the glass stock piece at the situs of the reaction in such manner as to form a hard crust-like coating thereover which masks the covered glass surface from further attack by the etching solution. Hence, when an acid etching process of this nature is attempted, especially in connection with a narrow acid entrance to the stock piece as referred to hereinabove, the etching action will quickly terminate after having been carried only to a shallow depth; and the solid salt by-products of the etching reaction will in some cases completely fill the recess so formed in the glass stock piece. Consequently, the depth to which the glass stock piece may be recessed by employment of this type of prior art method is definitely limited so as to provide completely unsatisfactory results for the purposes of the present invention and whenever deep etching is required.

The method of the present invention employs a novel etching solution and avoids the disadvantages and difficulties hereinabove referred to because it provides for automatic dislodgment and removal of the crust-like solid by-products of the etching reaction from the glass stock piece substantially coincidentally with the formation thereof. Consequently, no appreciable masking effect persists, and the glass reactive solution is unretarded to react with the glass stock to any depth desired, irrespective of the sectional dimension of the recess formed as controlled by the width of the aperture through the masking wax.

To this end the glass stock reactive solution is provided to comprise an aqueous solution of a mixture of sulphuric acid and hydrofluoric acid, wherein the sulphuric acid greatly predominates in relation to the amount, by weight, of hydrofluoric acid. I have found that when such a solution is employed the primary action between the glass stock and the solution seems to take place between the glass stock and the hydrofluoric acid component of the mixture, and that the metallic-floride salts so formed are immediately attacked by the sulphuric acid component of the solution. The reaction between the sulphuric acid and the fluoride salts produces a gaseous by-product in the form of fluoric acid which is liberated in such manner as to produce an effervescence which operates upon the crust-like solids tending to mask the glass stock against further acid-reaction processes. Thus, a multitude of gas bubbles are formed in the crust-like salt formations and expand therewithin until they become liberated to rise and escape from the bath as indicated at 15; and during this expanding and escaping process the gas bubbles heave against and mechanically disrupt any accumulations of solids tending to adhere to the surface of the stock piece. Thus, the solid fluorides will be constantly disrupted and broken into the form of small flakes of scale and lifted out of contact with the stock piece to float and rise in the liquid solution, as indicated at 16 in the drawing. Incidentally, the metallic-sulphate by-products of the sulphuric acid reaction with the metallic fluoride crusts are substantially soluble in the acid composition of the method of the invention. Hence, there is no tendency to deposit sulphate crusts upon the glass stock in place of the fluoride crusts.

Thus, it will be understood that in accord with the method of the invention masking of the situs of the etching operation is prevented, and that the etching operation is thereby enabled to continue to any depth desired, as will be controlled by the length of time during which the acid reaction will be allowed to continue. It will also be understood that by reason of the characteristics of the method of the invention the etching action along the lineal extent of any cut provided in the masking wax 12 will proceed at uniform rate, and that the groove in the glass stock piece so produced will be of uniform depth and regularity, and therefore of improved form for the purpose stated. Also, it will be noted that the etching acid solution of the invention operates to leave a relatively bright surface on the glass as distinguished from a fogged surface as provided by conventional etching methods; and that therefore the finished article of the invention is of superior physical and optical characteristics for many purposes.

It will of course be understood that the etching solution of the method of the invention may be varied in different respects to suit different conditions and to provide different results, such as speed of the manufacturing operation; depth to which the recessing operation is carried; etc. Also, the composition of the reagent solution may be varied somewhat to compensate for variations of the chemical composition of the glass stock to be processed. For example, I have determined that if the glass stock contains a substantial proportion of either lead or barium or boron, or mixtures thereof, the additional metallic content may be taken care of by employing sufficient sulphuric acid to insure the effervescence effect referred to. In any case the object is to provide a reagent solution which is capable of reacting with the glass stock to produce readily removable by-products, and to provide a vigorous effervescence effect for the purpose of heaving off the crusts of by-product solid substances as they tend to form against the treated surfaces of the stock piece.

More specifically, I have found that when working with a standard crown or sodium-calcium-silicate type glass, I get excellent results in accord with the purpose of the invention when employing an acid mixture comprising an aqueous solution of commercial sulphuric acid (66° Baumé) and 60% hydrofluoric acid wherein the sulphuric acid ingredient is approximately in the ratio of 10 to 1 with respect to the hydrofluoric acid ingredient. However, as in the case of most chemical processes, I have also found that suitable results may be obtained when the ratio of sulphuric to hydrofluoric acid is varied to a reasonable degree from the specific ratio given. For example, the action sought in accord with the concept of the invention may be attained in some cases when the ratio of sulphuric acid to hydrofluoric acid is somewhat lower, as in the neighborhood of 8 to 1 or 7 to 1, and higher as in the neighborhood of 15 to 1. Also, it will be appreciated that, as in the case of most chemical reactions, the speed of reaction will be influenced by the temperature of the chemical solution, and that although the temperatures created by the chemical reaction will normally control, the operation may be additionally affected by artificially regulating the temperature of the chemical bath, as may be preferred. Thus, it will be understood that the etching method of the invention comprises a simple, cheap, and practical process whereby glass stock may be relatively deeply recessed in one single operation, and whereby the tendency of masking by the reaction by-products is automatically avoided without attention by the operator of the process and without need of employing agitation or flushing processes, or the like.

Figure 2:
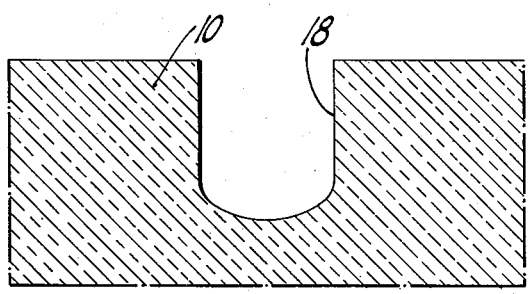
Fig. 2 is a section corresponding to Fig. 1, subsequent to completion of the etching process.
Figure 3:
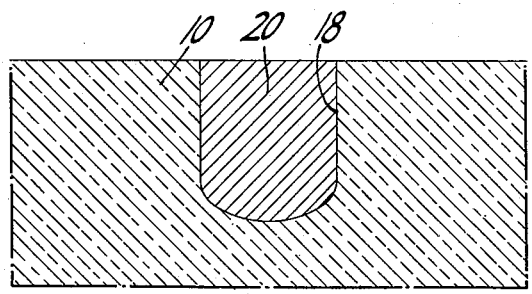
Fig. 3 is a view corresponding to Fig. 2 subsequent to disposal of a pigment substance within the etched recess portion of the stock piece.

Fig. 2 illustrates the glass stock piece subsequent to being etched as explaintd hereinabove; and the etched recess portion 18 thereof is shown in Fig. 3 as being packed with a mass of pigment substance 20, such as a colored clay or other suitable ceramic material in Fig. 3. It will be noticed that due to the substantial depth of the recess holding the pigment material the latter is firmly retained by the glass during a firing process; and a solid, rugged, composite glazed article may be thereby produced. Thus, it will be appreciated that by reason of the features of the invention referred to hereinabove, the finished article embodies an ornamental inlay which is of a uniformly substantial depth and otherwise of improved order; and that ornamental glassware such as tableware; goblets; bowls, and the like which are fabricated in accord with the invention will possess superiority with respect to durability and appearance of the ornamentation thereof.

The method of the present invention is not to be confused with prior art methods such as disclosed or referred to in my earlier Patents Nos. 2,238,008 and 2,275,602 wherein distinctly different types of glass etching and polishing operations are disclosed. The methods of the patents referred to and other prior art processes employ aqueous acid solutions wherein the ratio of hydrofluoric acid to sulphuric acid is either more nearly equal or greater; and the action of the acid mixtures in connection with such methods of the prior art are either to simply clarify and polish the broad outer surface of a glass stock piece without appreciable reducing attack thereon, or to opaquely etch the stock to shallow depth as explained hereinabove. As explained in my earlier patents referring to, the stock clarifying methods thereof depend upon suitable washing or rinsing or flushing or agitation operations intermediately of acid applications thereon; whereas the method of the present invention is particularly suited to act continuously on the stock piece progressively inwardly thereof without intermediate by-product flushing or other removal operations and irrespective of the minuteness of the opening which is provided for the acid mixture to gain access to the stock piece. Thus, it will be appreciated that the degree of predominance of the sulphuric acid ingredient of the acid mixture of the invention is a critical feature thereof, and that my discovery of the unexpected novel effects thereof as explained hereinabove constitutes a definite advance in the glass fabrication art.

It will also be appreciated that the etching method of the invention is applicable with equal facility to the production of a large variety of other glassware articles. For example, in connection with the manufacture of calibration scales on glass plates for optical instruments such as are termed reticles in the optical art, it is of prime importance that the calibrations grooved in the glass be to a depth sufficient to make the grooves clearly definable from the remainder of the stock piece; and preferably the grooves will be of such depth that they may be filled with pigment substance such as a colored clay or paint or the like, whereby the calibrations may be more readily discernible. In such cases the recesses to be etched in the glass plates are microscopically narrow and are arranged to be read through magnifying lenses incorporated in the instruments with which they are associated. Therefore it is of extreme importance that the calibration lines thereof be uniformly and deeply etched, even though they are microscopically narrow in transverse dimension; and, as explained hereinabove, the etching method of the invention makes possible a uniformly deep recessing for such purpose through even the minutest channels in the masking medium.

Although only a few specific examples of the application of the method of the invention have been illustrated and described in detail, it will be apparent that it is adapted to a large variety of applications and that various changes may be made therein without departing from the spirit of the invention or the scope of the appended claims.

I claim:

1. The method of recessing glass stock comprising applying thereto a recessing solution comprising an aqueous solution of a mixture of sulphuric acid and hydrofluoric acid wherein the ratio of sulphuric acid to hydrofluoric acid is in the neighborhood of ten to one.

2. The method of recessing glass stock comprising applying thereto a recessing solution comprising an aqueous solution of a mixture of sulphuric acid and hydrofluoric acid wherein the ratio of sulphuric acid to hydrofluoric acid is sufficient to cause effervescence as a result of the action between the sulphuric acid ingredient and the fluoride products of the action of the hydrofluoric acid ingredient on the glass stock and sufficient to insure continuous mechanical removal of the salt by-products of the chemical reactions upon the glass stock so as to avoid masking of the latter by salt deposits from uninterrupted action of the hydrofluoric acid.

3. The method of microscopically recessing glass stock comprising masking said glass stock with a hydrofluoric and sulphuric acid resistant substance, scoring said mask at a position overlying the position of the desired recessing, and applying to the stock under the scored portion of said mask a mixture of concentrated commercial sulphuric and hydrofluoric acids wherein the ratio of sulphuric acid to hydrofluoric acid is in the neighborhood of ten to one.

4. The method of microscopically recessing glass stock comprising masking said glass stock with a hydrofluoric and sulphuric acid resistant substance, scoring said mask at a position overlying the position of the desired recessing, and applying to the stock under the scored portion of said mask a mixture of concentrated commercial sulphuric and hydrofluoric acids wherein the ratio of sulphuric acid to hydrofluoric acid is sufficient to cause effervescence as a result of the action between the sulphuric acid ingredient and the fluoride products of the action of the hydrofluoric acid ingredient on the glass stock and sufficient to insure continuous mechanical removal of the salt by-products of the chemical reactions upon the glass stock so as to avoid masking of the latter by salt deposits from uninterrupted action of the hydrofluoric acid.

VICTOR WALKER.